(12) United States Patent
Zhong

(10) Patent No.: US 11,286,900 B2
(45) Date of Patent: Mar. 29, 2022

(54) WAVE POWER GENERATION UNIT SUITABLE FOR LARGE-SCALE APPLICATION AND SYSTEM THEREOF

(71) Applicant: Sheng Zhong, Zhejiang (CN)

(72) Inventor: Sheng Zhong, Zhejiang (CN)

( * ) Notice: Subject to any disclaimer, the term of this patent is extended or adjusted under 35 U.S.C. 154(b) by 75 days.

(21) Appl. No.: 16/978,749

(22) PCT Filed: Nov. 29, 2018

(86) PCT No.: PCT/CN2018/118050
§ 371 (c)(1),
(2) Date: Sep. 7, 2020

(87) PCT Pub. No.: WO2019/169910
PCT Pub. Date: Sep. 12, 2019

(65) Prior Publication Data
US 2021/0047993 A1    Feb. 18, 2021

(30) Foreign Application Priority Data

Mar. 5, 2018  (CN) .......................... 201810177939.3
Jun. 8, 2018  (CN) .......................... 201810584759.7

(51) Int. Cl.
*F03B 13/18* (2006.01)
*B63B 35/44* (2006.01)
*F03B 13/16* (2006.01)

(52) U.S. Cl.
CPC .......... *F03B 13/1805* (2013.01); *B63B 35/44* (2013.01); *F03B 13/16* (2013.01); *B63B 2035/4466* (2013.01)

(58) Field of Classification Search
CPC ...... F03B 13/20; F03B 13/1805; F03B 13/16; Y02E 10/30; F05B 2240/93; B63B 35/44; B63B 2035/4466
See application file for complete search history.

(56) References Cited

U.S. PATENT DOCUMENTS

| 9,429,135 B2 * | 8/2016 | Lavelle ................... F03B 13/20 |
| 2008/0295509 A1 * | 12/2008 | Bernitsas ................ F03B 17/06 60/497 |

(Continued)

FOREIGN PATENT DOCUMENTS

| CN | 102678432 A | 9/2012 |
| CN | 102691610 A | 9/2012 |

(Continued)

OTHER PUBLICATIONS

International Search Report dated Mar. 11, 2019, in connection with PCT/CN2018/118050, filed Nov. 29, 2018.

*Primary Examiner* — Shafiq Mian
(74) *Attorney, Agent, or Firm* — Downs Rachlin Martin PLLC

(57) ABSTRACT

A wave power generation unit suitable for large-scale application and a system thereof are disclosed. The wave power generation unit includes at least two types of water platforms that dynamically differ from each other under the effect of waves: stationary floating platform and movable floating platform. The two types of floating platforms are paired to form a functional unit, and the difference between the two floating platforms caused by waves causes interactions between the two floating platforms. The movable floating platform converts wave energy into mechanical energy, and the stationary floating platform converts machinery energy into electrical energy. The dynamic features of the floating platform are adjusted by a sink and float control device or a peripheral lifting device, and the adjustment effect is enhanced by a large-mass flywheel. Multiple wave power generation units form a wave power generation system.

20 Claims, 10 Drawing Sheets

(56) References Cited

U.S. PATENT DOCUMENTS

| | | | | |
|---|---|---|---|---|
| 2011/0169265 A1* | 7/2011 | Chen | ............... | F03B 7/00 |
| | | | | 290/53 |
| 2012/0001431 A1* | 1/2012 | Smith | ............... | E02B 17/0004 |
| | | | | 290/53 |
| 2013/0160444 A1* | 6/2013 | Foster | ............... | F03B 13/1885 |
| | | | | 60/497 |
| 2016/0186716 A1* | 6/2016 | Hine | ............... | B63B 21/66 |
| | | | | 440/9 |
| 2019/0040840 A1* | 2/2019 | Rohrer | ............... | F03B 13/182 |

FOREIGN PATENT DOCUMENTS

| | | |
|---|---|---|
| CN | 103523181 A | 1/2014 |
| CN | 104454320 A | 3/2015 |
| CN | 104514673 A | 4/2015 |
| CN | 104775979 A | 7/2015 |
| CN | 108131236 A | 6/2018 |
| CN | 108506153 A | 9/2018 |
| KR | 20090080275 A | 7/2009 |

\* cited by examiner

WAVE POWER GENERATION UNIT SUITABLE FOR LARGE-SCALE APPLICATION AND SYSTEM THEREOF

CROSS REFERENCE TO RELATED APPLICATIONS

This application claims priority to Chinese Patent Application No. 201810177939.3, filed on Mar. 5, 2018 and entitled "FLOATING WAVE POWER DEVICE", and Chinese Patent Application No. 201810584759.7, filed on Jun. 8, 2018 and entitled "FLOATING TABLE TYPE WAVE POWER GENERATION DEVICE ACHIEVING NETTING LARGE-SCALE APPLICATION", which are hereby incorporated by reference in its entirety.

This application is still based on the three technical elements established in the first application:

1. Wave Power Generation Mechanism:

Under the action of waves, dynamic differences are generated between two floating platforms, which cause interactions between the two floating platforms to convert wave energy into mechanical energy, and then drive a mechanically-driven power generation device to generate power. Based on this theory, small wave power generation units are made and are further combined to form a larger wave power generation system.

2. Wave Energy Adjustment Mechanism:

The float-and-sink function of the floating platform is used to control the floating and sinking states and the center-of-gravity position change of the platform to affect the change of dynamic features such as the vibration frequency and amplitude, thereby adjusting the power of the wave power generation device.

3. Self-Protection Mechanism Against Environmental and Climate Factors:

Devices and action mechanisms are installed away from water in the internal sealed space of the floating platform and the space above the waterline of the platform, to prevent diseases caused by environmental factors. The floating platform can be controlled floating or sunk or be moved to escape from disasters caused by climate factors.

This application optimizes the narration of the above elements to make it more in line with the norms. This application also adds some structures on the original foundation to strengthen the original mechanisms. Drawings that are slightly different from this application have been attached. See FIG. 10, FIG. 11, FIG. 12, FIG. 13, and FIG. 14.

TECHNICAL FIELD

The present invention relates to the technical field of renewable energy, and specifically, to a wave power generation unit suitable for large-scale application and a system thereof.

BACKGROUND

Wave power generation is not a new topic. Since the emergence of the contradiction between the increasing demand for energy and the growing awareness of environmental protection, the attempts to actively develop various clean and renewable energy sources have never stopped. Why are there few instances of large-scale use of ocean wave energy to generate power when the wind and solar energy has been widely utilized? Through prior art searches, the inventor found that the existing solutions always have some limitations, which block the industrial application of wave power generation.

For example, most of the solutions are applicable to manufacture devices used to protect marine monitoring or navigation aids, with a limited scale; or manufacture devices that are too sophisticated and costly but less reliable; or manufacture devices without considering the rigid waterproof and anti-corrosive requirements imposed by the marine environment on the devices and materials. There are still many other limitations. For example, some devices have to rely on special terrain and sea conditions or solid pile foundations, and can only be placed in shallow water near the shore, with a narrow application scope; some even ignore the complex and changeable ocean climate, and the device structure is extremely poor in wind and wave resistance; some have good wind and wave resistance, but must submerge to the seabed, making routine maintenance inconvenient. In short, these solutions have a common problem: they all focus on how the devices generate power in an ideal state, without considering how this very critical "ideal state" can be generated or maintained.

The ocean is a very wide, deep, and unpredictable zone. To use wave energy to generate power, the first step is to choose a power generation device that is suitable for wave energy harvesting and able to operate efficiently and reliably under certain ideal conditions. The wave energy is actually a kind of vibration energy that tends to the surface of the water body. It scatters in a wide area unevenly and unstably with changing directions. There are straight or whirling flows of water on the horizontal plane, as well as the ups and downs on the vertical plane. If one technical solution focuses only on the flow of water, or floating of water, or a combination of the flow and floating of water in one direction, or only a small part of the total amount, this technical solution is not desirable even with a high efficiency.

In addition, how to make best use of wave energy should consider how to achieve the "quality" requirement of comprehensive harvesting and transformation of wave energy, as well as the "quantity" requirement of whether the device has the ability to harvest and transform a large amount of scattered wave energy, that is, use an effective way to increase the total amount of work done.

Still, in addition to these issues, a truly feasible technical solution should also cover some unavoidable serious problems, such as diseases and disasters in humidity and high salt environments, and extreme marine climate disasters such as devastating typhoons. Although a relatively "ideal" sea environment can be selected for the wave power generation device, unexpected environmental changes may occur. Even if various ideal conditions are met, the devices are inevitably aged and worn out. Then, how is the essential routine maintenance implemented? How are technical means used to create some adjustable and controllable mechanisms to artificially intervene in or create conditions that can maintain the "ideal state"? Especially for a marine environment that changes in the morning and evening, how can synchronization and coordination be implemented in response to the ever-changing total required energy? Once these problems are solved, the wave power generation device can cope with various changes in various sea terrains and be widely used in various environmental conditions.

SUMMARY

The present invention is intended to provide a wave power generation unit suitable for large-scale application and a system thereof. To put it simply, a solution to the above problems is to build a cluster structure combined with multiple water platforms for accommodating wave power generation devices. These water platforms are not simply floating structures that can only discharge a certain volume of water. They have common attributes such as floating and movable, as well as distinctive functions of doing work and being coordinated. In addition, they are designed as a structure that are easily connected or expanded. They are some functional individuals that implement respective tasks and can cooperate to form a large cluster structure on the water surface. Because waves are characterized by wide distribution, the most effective way is to select the appropriate shapes, structures, and functions according to the conditions of the implementation environment. There should be a mechanism for connecting or further expanding the functional individuals to establish a large cluster structure, and a coordination mechanism that facilitates the efficient and safe work of these functional individuals, to do work in scale.

The following only list examples for the most important work process of wave power generation. In a specific implementation, the movable property of the water platforms involved in this work process is specified as floating, and the platforms are classified into stationary floating platforms and movable floating platforms based on the minimum binary value 2. For ease of description, the components are numbered with reference to FIG. 1 to FIG. 14. Through the most characteristic pairwise cooperation, the composition and characteristics of the wave power generation device are explained. The multi-unit cooperation mechanism under ternary or even multi-component classifications cannot be separated from the basis of this pairwise cooperation, and analog can be derived thereof. Therefore, details in other classifications are not listed one by one herein.

In order to achieve the above purposes, the present invention provides a wave power generation unit suitable for large-scale application. The wave power generation unit includes at least two types of floating platforms: stationary floating platform 1 and movable floating platform 2. The stationary floating platform 1 and the movable floating platform 2 form a functional unit. The difference between the two floating platforms caused by different effects from waves causes interactions between the two floating platforms, to convert wave energy into mechanical energy, and then drive mechanical devices to operate and a power generation mechanism to generate power.

The water platforms are all suspending in the water, and have a sealed space for accommodating devices.

The stationary floating platform 1 is an elongated structure that extends into the water.

The movable floating platform 2 is a flat structure that is disposed on the water surface.

Specifically, in some implementations, the wave power generation unit includes at least two types of floating platforms that dynamically differ from each other under the effect of waves: stationary floating platform 1 and movable floating platform 2. One stationary floating platform 1 and one movable floating platform 2 are paired to form a functional unit. The difference between the two floating platforms caused by different effects from waves causes interactions between the two floating platforms, to convert wave energy into mechanical energy, and then drive mechanical devices to operate and a power generation device to generate power.

The floating platforms are all water platforms with a sealed space for accommodating mechanically operating devices away from water.

The stationary floating platform 1 and the movable floating platform 2 are classified by shape or function.

In terms of shape, the stationary floating platform 1 is an elongated structure that extends into the water, and the movable floating platform 2 is a flat structure that is disposed on the water surface.

In terms of function, the stationary floating platform 1 is used as a carrier to realize or assist in conversion of mechanical energy to electric energy, and the movable floating platform 2 is used as a carrier to realize or assist in conversion of wave energy to mechanical energy.

In a specific implementation of the wave power generation unit, the stationary floating platform 1 is provided with outwardly extending rocker arms 4, which are connected to connecting rods 7 extending from the movable floating platform 2 through movable joints 6. When the movable floating platform 2 moves, one end of the rocker arm 4 is driven to move up and down, and then a transmission shaft 5 connected to the other end of the rocker arm 4 is driven to reciprocate, driving a hydraulic driving device 13 to operate and a flywheel device 12 and the power generation device 3 to generate power.

In a specific implementation of the wave power generation unit, the movable floating platform 2 includes a spring return mechanism 8. The connecting rod 7 is sleeved in the spring return mechanism 8, and the spring return mechanism 8 enables the connecting rod 7 to linearly expand or contract along the axis of the connecting rod or to rotate around the pivot of the connecting rod. The connecting rod 7 extends outwards, and is connected to the rocker arm 4 on the stationary floating platform 1 through the movable joint 6.

In a specific implementation of the wave power generation unit, the stationary floating platform 1 and the movable floating platform 2 each have a water storage device 10, which controls the center-of-gravity position or the floating and sinking states of the floating platform to change its dynamic features by injecting water into or discharging water from a storage tank, and is used in a mechanism for adjusting the working power and dealing with environmental and climate changes.

In a specific implementation of the wave power generation unit, the stationary floating platform 1 has a flywheel device 12 based on a large-mass flywheel, which is used as a high-power energy buffer for adjusting the working power or a mechanism for stabilizing the platform's state in water.

In a specific implementation of the wave power generation unit, the movable floating platform 2 has a spring return device 8, which is used as an energy buffer to adjust the working power, or a buffer upon deformation of interconnection mechanisms between the platforms to restore the mechanisms.

In a specific implementation of the wave power generation unit, the movable floating platform 2 has a peripheral lifting device 14, which changes dynamic features by changing the center-of-gravity position of the floating platform, and is used in a mechanism for adjusting the working power and dealing with environmental and climate changes.

In a specific implementation of the wave power generation unit, the movable floating platform 2 is provided with a windward device, which is used in a mechanism that uses wind energy to generate kinetic energy for doing work.

In a specific implementation of the wave power generation unit, the stationary floating platform 1 is provided with a water diversion device 15, which is used in a mechanism that guides the deep water to float on the surface or guides the waves on the surface to gather for doing work.

In a specific implementation of the wave power generation unit, the stationary floating platform 1 and the movable floating platform 2 each are provided with an inspection entrance to the interior of the floating platform.

In a specific implementation of the wave power generation unit, the stationary floating platform 1 has a structural component connected with a fixed foundation, which is a mechanism for constraining the stationary floating platform or fixing the stationary floating platform on the seabed.

In a specific implementation of the wave power generation unit, the stationary floating platform 1 is a bowling ball-shaped floating structure with a hollow sealed cavity. Under normal conditions, the stationary floating platform is semi-submersible and vertically floating, with most of the cavity in the lower part deep into the water and a small upper part above the water. With the center of gravity in the lower part, the platform is not easy to flip.

In a specific implementation of the wave power generation unit, the movable floating platform 2 is an inverted cone-shaped floating structure with a hollow sealed cavity. Under normal conditions, the movable floating platform is semi-submersible and vertically floating. Most of the cavity in the upper part is above the water, leaving the center of gravity in the upper part and the platform easy to shake. The cavity in the lower part is deep into the water by connecting to a strip-shaped structure as a counterweight.

In a specific implementation of the wave power generation unit, the stationary floating platform 1 is equipped with a hydraulic drive device 13, a flywheel device 12, a power generation device 3, and rocker arms 4. It is a carrier that realizes or assists in conversion of mechanical energy to electrical energy.

In a specific implementation of the wave power generation unit, the movable floating platform 2 is equipped with a spring return device 8, a peripheral lifting device 14, a swing counterweight 9, and a windward device. It is a carrier that realizes or assists in conversion of wave energy to mechanical energy.

In a specific implementation, the wave power generation unit includes a stationary floating platform 1 and four movable floating platforms 2 in cross symmetry.

In a specific implementation, the wave power generation unit includes a movable floating platform 2 and four stationary floating platforms 1 in cross symmetry.

The present invention also provides a wave power generation system suitable for large-scale application, which is a cluster structure of a number of wave power generation units composed of several types of floating platforms in the foregoing implementations.

In a specific implementation of the wave power generation system, one stationary floating platform 1 is connected to four movable floating platforms 2 in cross symmetry, and one movable floating platform 2 is connected to four stationary floating platforms 1 in cross symmetry, so that they are connected to form a large floating platform cluster.

Compared with the prior art, the present invention has the advantages of lower environmental requirements, wider application area, stronger energy harvesting ability, larger power output, as well as the adaptive power adjustment mechanism that other technologies cannot easily implement, a high-power energy storage mechanism, and a self-protection mechanism for dealing with diseases and disasters.

Figure 1:
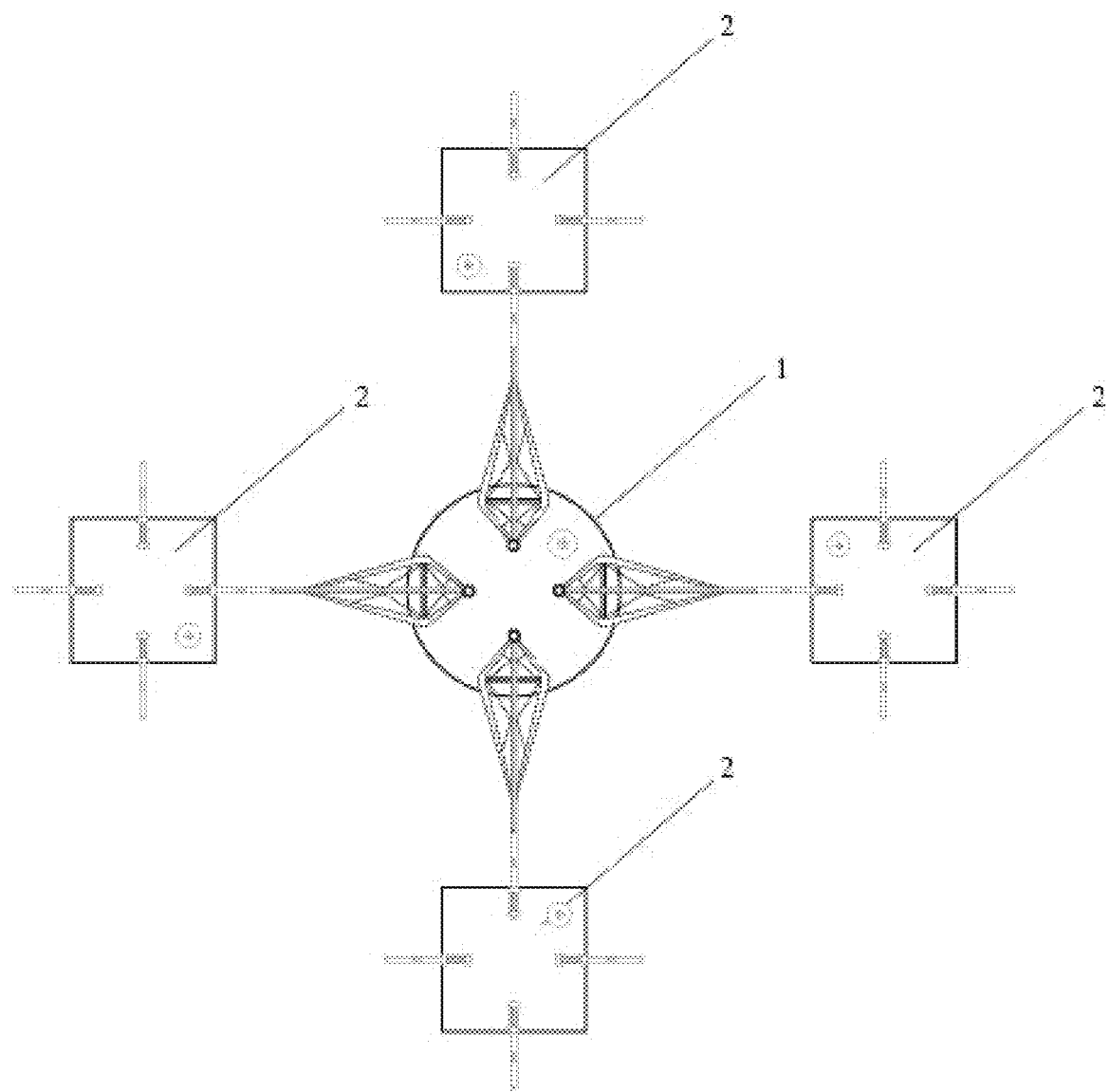
FIG. 1 is a top view of a structure of a functional unit composed of a stationary floating platform and four movable floating platforms in cross symmetry according to the present invention.

REFERENCE NUMERALS 1. stationary floating platform; 2. movable floating platform; 3. power generation device;

4. rocker arm; 5. transmission shaft; 6. movable joint;

7. connecting rod; 8. spring return device; 9. swing counterweight;

10. water storage device; 11. inspection entrance; 12. flywheel device;

13. hydraulic drive device; 14. peripheral lifting device; and 15. water diversion device.

Notes:

The drawings are only representative plan views. For brevity and ease of description, only the key functional components are shown and numbered. Other components that are mentioned in the specification but are not marked in the diagram, or have no operating principle descriptions in the specification, such as a fly-by-wire linkage control system, a mooring traction structure, a windward device, and an electrical transmission equipment, have practical examples or can be easily realized in the prior art, and therefore details are not provided herein.

Taking a functional unit composed of a stationary floating platform and four movable floating platforms in cross symmetry in FIG. 1 as an example, with reference to the functional components marked in FIG. 2 to FIG. 14, the specific operating modes are simulated as follows.

Figure 7:
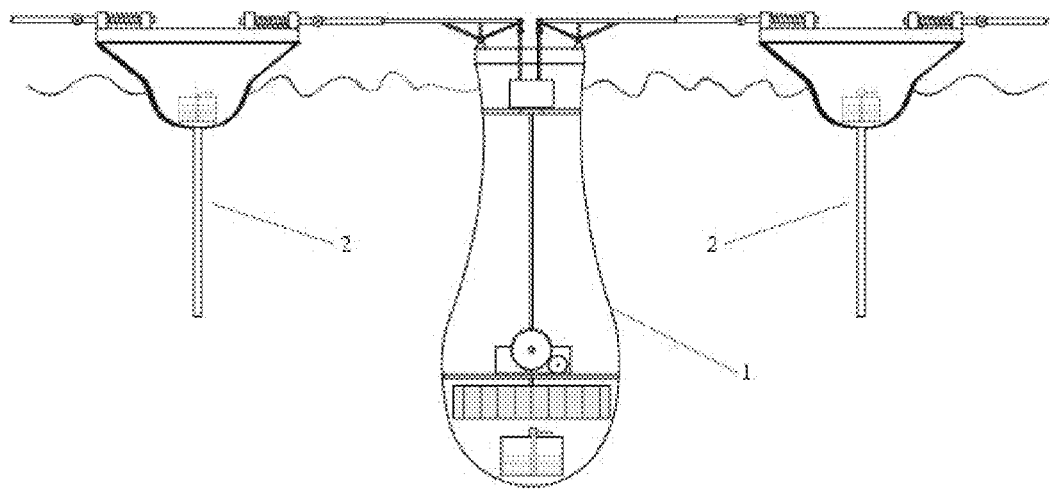
FIG. 7 is a sectional view of a structure of a stationary floating platform and two symmetrically arranged movable floating platforms according to the present invention.

1. Surface operation mode: When there is no wind and waves, the stationary floating platform 1 and the four movable floating platforms 2 in cross symmetry are in a static equilibrium state, and the system does not do work. As shown in FIG. 7, when the wind and waves come, one of the movable floating platforms floats up first with the wave crest, and the stationary floating platform connected behind it is still at a position lower than the movable floating platform. At this time, their position changes break the equilibrium state. Driven by the connecting rod 7 and the movable floating platform, the rocker arm 4 on the stationary floating platform has one end lifted up and the other end dragged down, which drives the transmission shaft 5 to move downward under the coordination of the movable joint 6. The transmission shaft 5 transmits kinetic energy to the internal hydraulic drive device 13 through a sealing ring, driving the flywheel device 12 and the power generation device 3. The power generation device 3 starts to work and generates electrical energy. When the movable floating platform falls to the trough, the stationary floating platform is still at its original position, higher than the movable floating platform. Driven by the connecting rod 7 and the movable floating platform, the rocker arm 4 on the stationary floating platform has one end dragged down and the other end lifted up, which drives the transmission shaft 5 to move upward under the coordination of the movable joint 6. The transmission shaft 5 transmits kinetic energy to the internal hydraulic drive device 13 through the sealing ring, driving the flywheel device 12 and the power generation device 3 to do work and generate power. The above actions repeat, and the power generation device 3 can continuously work and generate power.

As described above, another movable floating platform connected to the stationary floating platform and arranged in symmetry with the foregoing movable floating platform also performs similar actions, and can also provide a reaction force in response to the lever effect of the rocker arm on the stationary floating platform.

In addition, for the other two symmetrically distributed movable floating platforms on the other two sides of the stationary floating platform, their states are affected but not restricted by the previous actions, and their connected rocker arms 4 are driven up or down through the connecting rods 7, driving the power generation devices 3 to do work; or a "shaft" for another pair of rocker arms to move up or down is formed, to coordinate units of the power generation device to steadily vibrate through a set of flipping actions.

Figure 2:
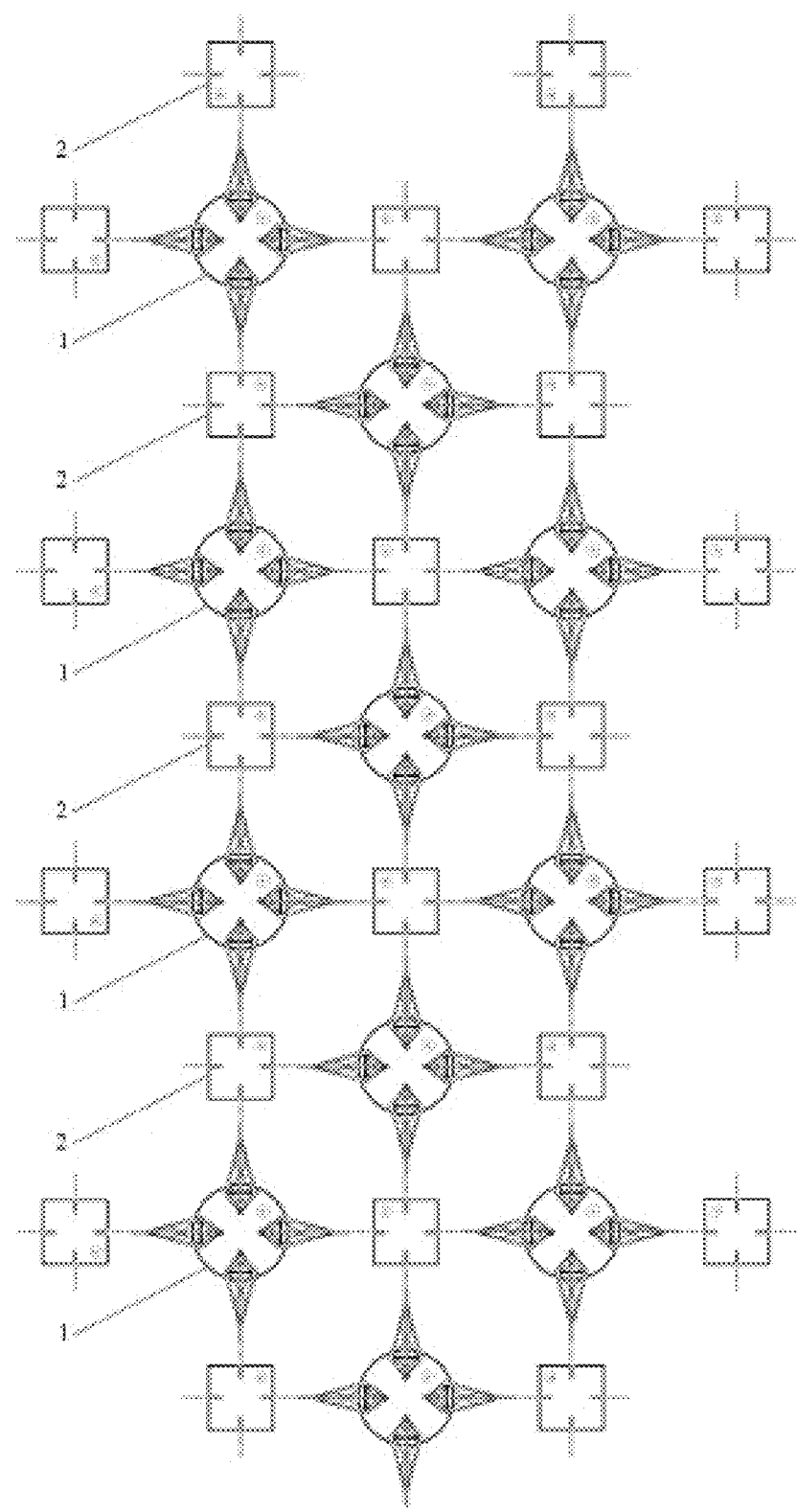
FIG. 2 is a partial top view of multiple networked functional units according to the present invention.
Figure 8:
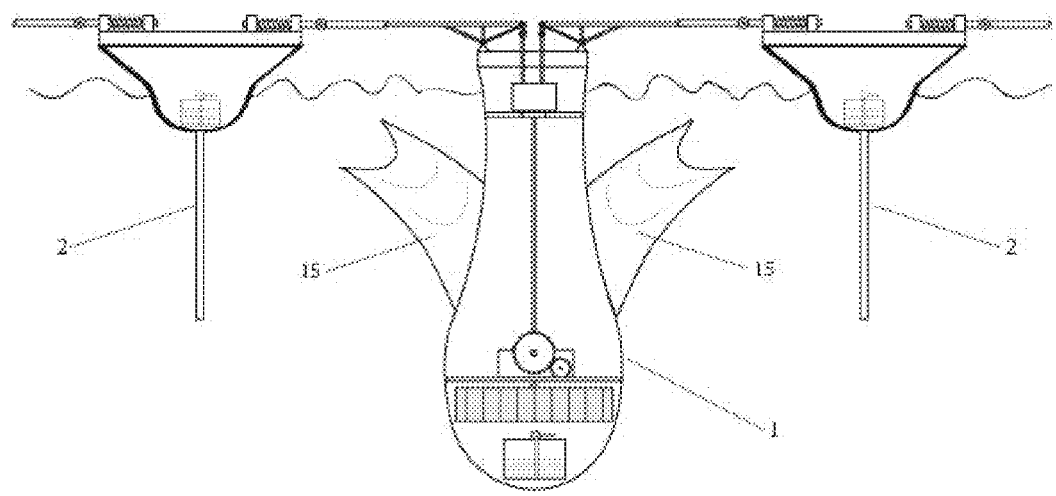
FIG. 8 is a sectional view of a stationary floating platform configured with a water diversion device, and two symmetrically arranged movable floating platforms according to the present invention.

2. Deep ocean current operating mode: When deep water flows such as tides and ocean currents pass by, as shown in FIG. 2, the two types of floating platforms are combined to form a cluster. They form a large network on the sea surface and form a water barrier under the water. Due to the different shapes of the stationary floating platforms and the movable floating platforms, they will dynamically change differently after being hit by water currents. In addition, the water diversion device 15 can guide the deep water to flow on the surface towards the movable floating platform (FIG. 8). The swing amplitude of the stationary floating platform is small, and the swing amplitude of the movable floating platform is large. The interactions caused by this difference and work mode are the same as those described above, and details are not repeated herein.

DETAILED DESCRIPTION

Figure 5:
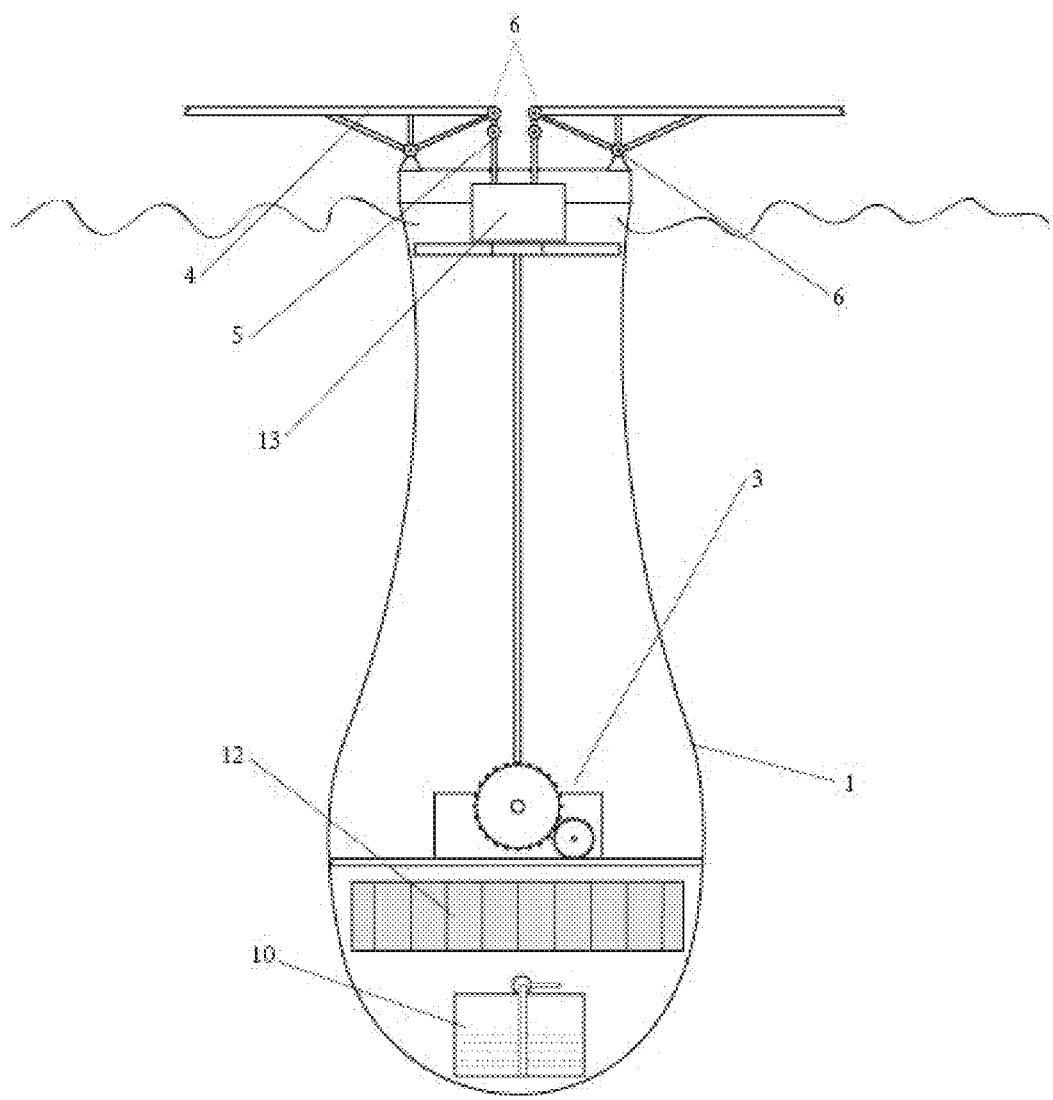
FIG. 5 is a sectional view of a side of a stationary floating platform according to the present invention.
Figure 6:
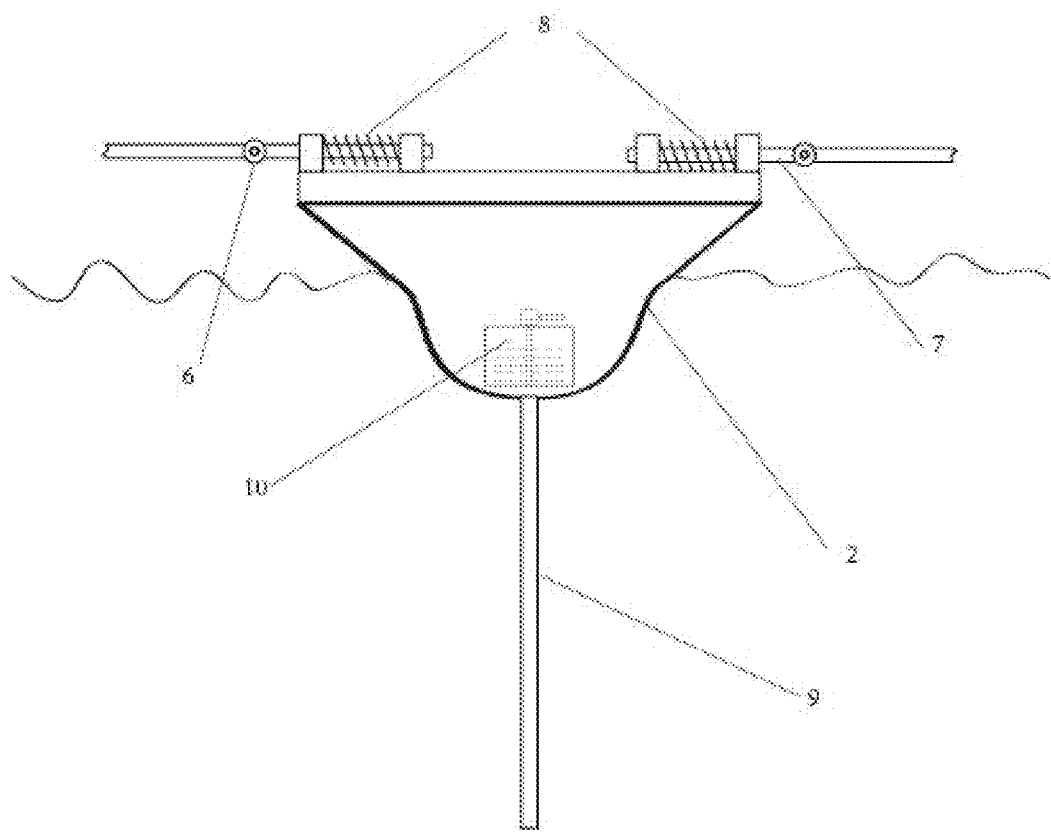
FIG. 6 is a sectional view of a side of a movable floating platform according to the present invention.

The shape selection criterion of "selecting the appropriate shapes, structures, and functions according to the conditions of the implementation environment" is provided in the specification of the present invention. In order to expand its environmental adaptability and ease installation, a water platform participating in the work is designed as a floating structure with a sealed space but not dependent on a fixed foundation, and the movable attribute is defined as suspended movement. Therefore, the platform is called a floating platform. The platforms are classified based on the minimum binary value 2. To maximize the dynamic difference caused by waves and improve the interactive effect, the platforms are classified into two types with extremely different forms: One is a strip-shaped floating platform that extends into the water and stays steadily suspending in the water, which is designed based on the concept of seeking for a steady state that is disposed infinitely close to the "stationary" state. This type of platform is called a stationary floating platform in the specification, as shown in FIG. 5. The other is a flat floating platform that tends to the water surface and is unsteadily suspending in the water, which is designed based on the concept of seeking for a dynamic state that is disposed infinitely close to the "fluctuating" state. This type of platform is called a movable floating platform in the specification, as shown in FIG. 6. The platforms do not rely on other submarine pile foundations or some shore-based fixation mechanisms. Instead, based on the different effects caused by the floating or flow impact force of waves on the two different types of platforms, the resulting dynamic difference is transformed into mechanical interaction, so that the irregular vibration energy of the water is converted into regular mechanical energy, which in turn drives the mechanical device to operate, and thus drives the power generation device to generate power.

These two types of floating platforms are different not only in form, but also in function. They implement different functions, or multiple platforms are combined to implement functions of a cluster. The stationary floating platform is used as a carrier to realize or assist in conversion of mechanical energy to electric energy, and the movable floating platform is used as a carrier to realize or assist in conversion of wave energy to mechanical energy.

There are many ways of interconnection and matching. For example, one stationary floating platform can be connected to multiple movable floating platforms, or one dynamic platform can be connected to multiple stationary floating platforms, to form an efficient functional unit. Only stationary or movable floating platforms may also be applicable, but the efficiency is low. Therefore, details are omitted herein.

Figure 3:
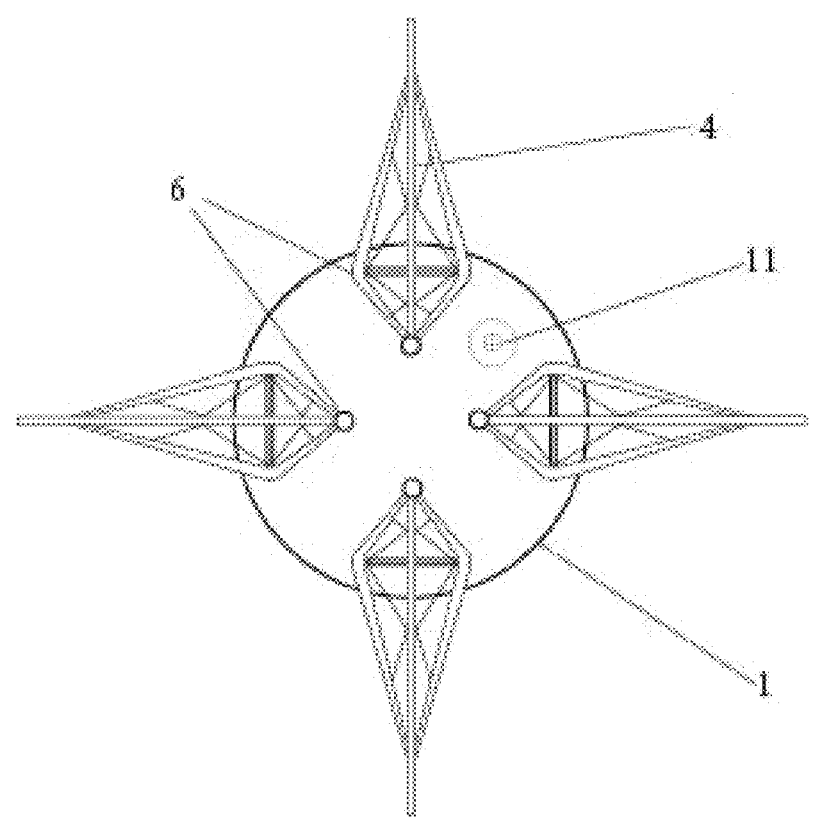
FIG. 3 is a top view of an overall structure of a stationary floating platform according to the present invention.
Figure 4:
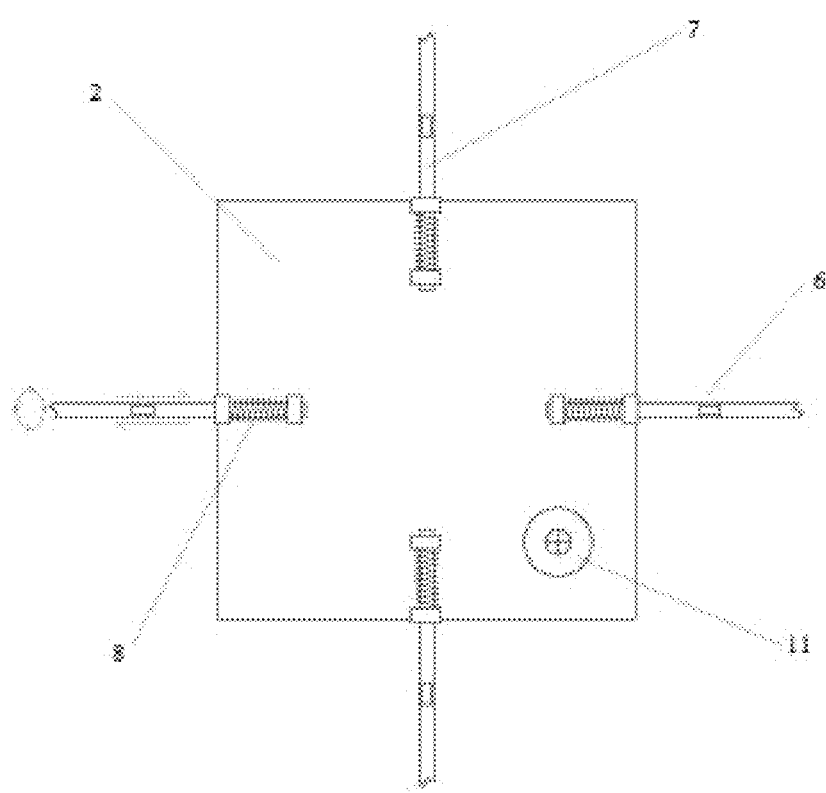
FIG. 4 is a top view of an overall structure of a movable floating platform according to the present invention.

The differentiated combination of stationary and movable floating platforms features clear task division, obvious interaction, simple and efficient implementation, and reliable operation. A complete functional unit composed of 1+4 floating platforms is the most typical. In this structure, four outwardly extending rocker arms are arranged in cross symmetry on a stationary floating platform (as shown in FIG. 3), and four outwardly extending connecting rods are arranged in cross symmetry on a movable floating platform (as shown in FIG. 4). The rocker arms and the connecting rods are correspondingly connected by movable joints. From the perspective of the stationary floating platform, it is connected to four movable floating platforms (as shown in FIG. 1). Certainly, from the perspective of the movable floating platform, it is connected to four stationary floating platforms. In this structure, one unit can operate independently as a system, or multiple units can be horizontally or vertically connected to form a large network cluster based on a quadrilateral structure (shown in FIG. 2). When tens or hundreds of such functional units are combined, all the floating platforms are nodes in the network. They are crossly connected, cooperate with each other, and share components to form an array, thereby forming multiple large clusters with low costs.

Generally, they can be semi-submersible and suspending in the water after being moored with anchor chains or ropes to pile foundations, drilling platforms, coasts, islands, accompanying ships, or buoys. They are easy to install and can automatically adjust the best impact direction with wind and waves. Their floating structure and interactive working mode between floating platforms, as well as a variety of work adjustment and self-protection mechanisms can deal with various changes, allowing the platforms to be placed in any areas without being subjected to environmental and climate limitations. They are particularly suitable for deep sea and ocean environments. The mooring here is not the same as the fixation in other technical solutions, and plays a greatly different role. Herein, mooring is only to keep units in a specified area without drifting, instead of participating in doing work. In some occasions, mooring is optional. However, it should be noted that, as an improvement of some specific implementations, in order to fix their positions or simplify their structures, part of the functions or components of the floating platforms can be incorporated or constrained in ships, drilling platforms, pile foundations, coasts, or other facilities, and some components or individuals exist in a non-suspending state or as non-floating platform structures. Therefore, it is not limited to that all components must exist as floating-platform structures. For example, when the accommodation environment is suitable and conditions permit, a combination of the "stationary floating platform" and "movable floating platform" can be constrained by some fixed foundations established on the coast or underwater reefs or even placed on the seafloor, to become non-floating structures with fixed foundations, according to the requirement of "infinitely close to a still state". At the beginning, "floating" was chosen for the convenience of placement, and now "fixed" is chosen for the dynamic difference. This "contradiction" arises from "selecting according to the conditions of the implementation environment". This can be solved by configuring structural components for connecting to the fixed foundations, without violating or exceeding the scope of the unified manufacturing criterion of "not dependent on fixed foundations". This is just an improvement to adapt to different use cases without essential changes.

Figure 10:
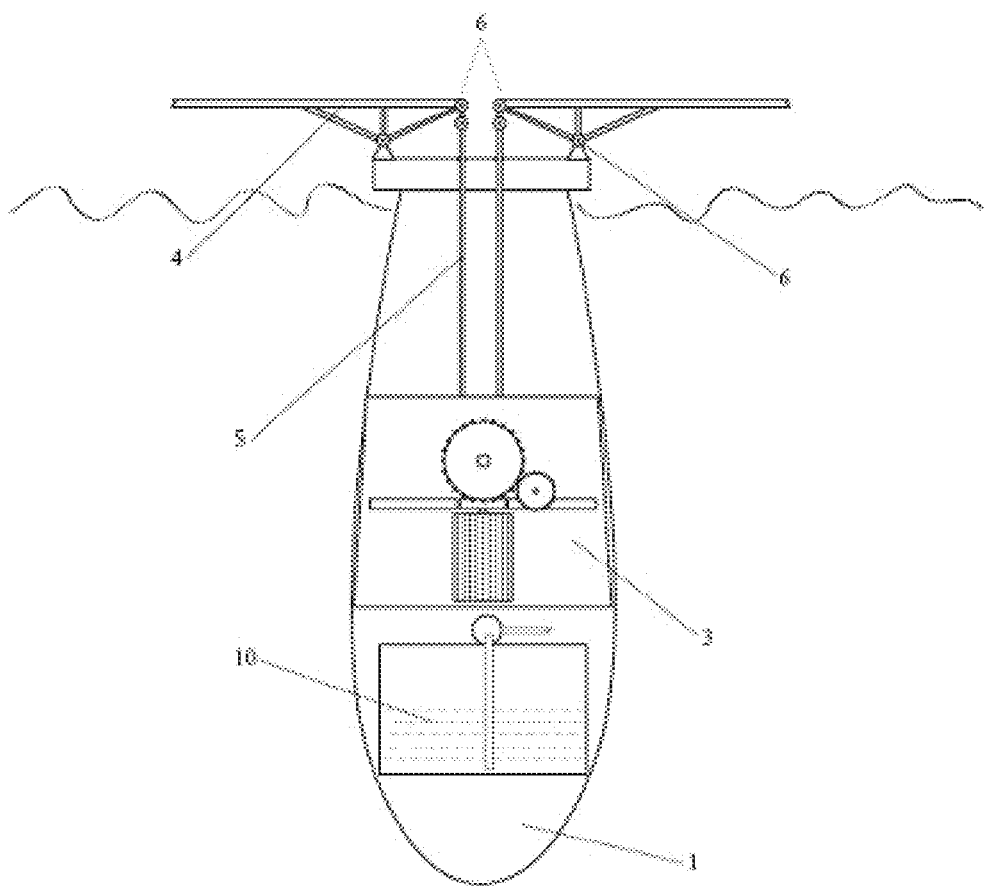
FIG. 10 is a sectional view of another stationary floating platform according to the present invention.
Figure 13:
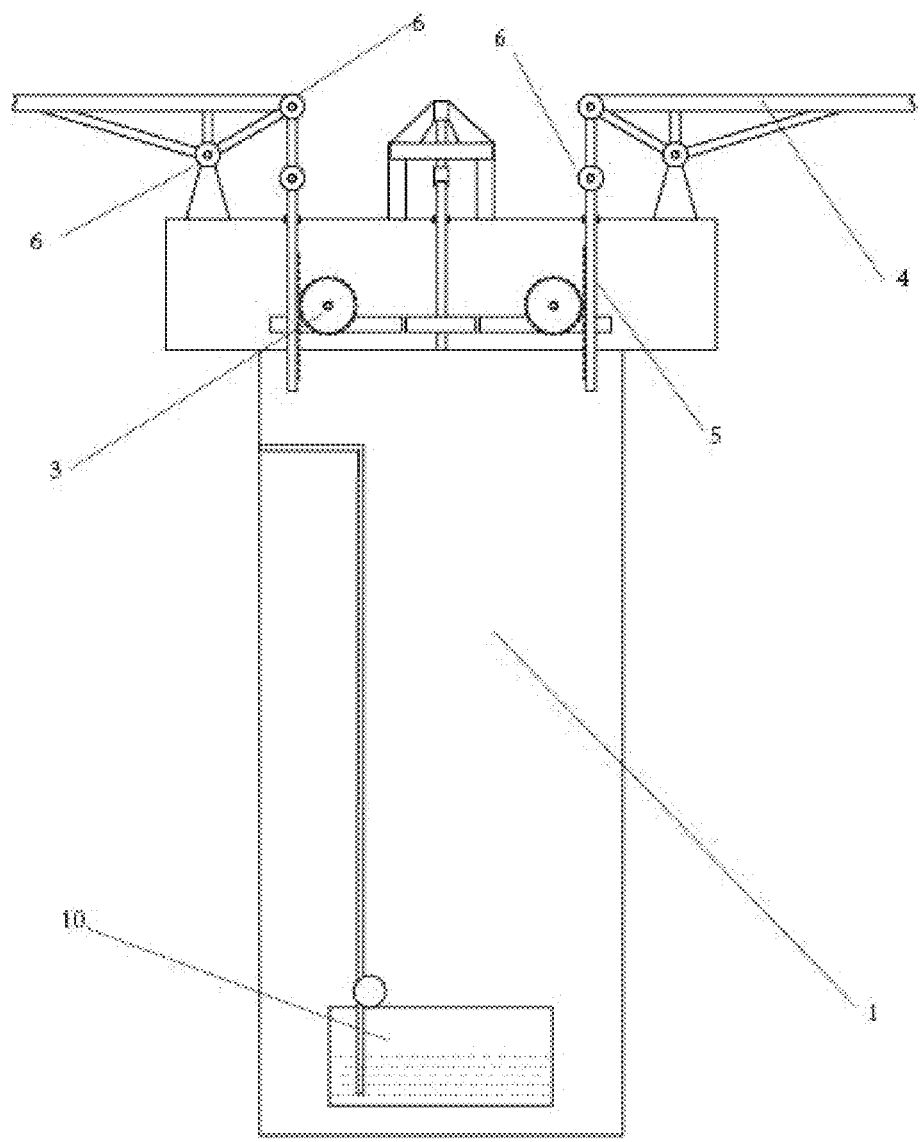
FIG. 13 is a sectional view of another stationary floating platform according to the present invention.

As mentioned earlier, wave energy is actually a kind of vibration energy that tends to the water surface. In this example, to avoid this effect, the stationary floating platform that seeks for stability uses a long strip shape that tends to deep into the water. It is specifically designed as a bowling ball-shaped with a hollow sealed cavity. See FIG. 5, FIG. 10, and FIG. 13, where FIG. 10 and FIG. 13 are drawings in the last two applications. Under normal conditions, the stationary floating platform is semi-submersible and vertically floating, with most of the cavity in the lower part deep into the water and a small upper part above the water. With the center of gravity in the lower part, the platform is not easy to flip. It looks like a big fishing float stuck in the water. A sealed space isolated from the outside environment is provided inside to avoid direct contact with high humidity or high salt environments. This sealed space is used for installing devices that realize or assist in conversion of mechanical energy to electrical energy, such as hydraulic drive devices, flywheel devices, power generation devices, and fly-by-wire control systems. The top platform is normally kept above the waterline, and there are four rocker arms distributed in cross symmetry like seesaws. One end of the rocker arm extends outward to connect to the movable floating platform, and the other end connects inward to the transmission shaft. Based on the principle of leverage, the rocker arm moves up and down under the action of the movable floating platform, driving the transmission shaft to reciprocate and transmit kinetic energy into the cavity through the sealing ring on the platform, to drive the hydraulic drive device, and then drive the flywheel device and the power generation device to generate power. In addition, there is an inspection entrance on the platform, allowing personnel to enter the floating platform for routine maintenance. With reference to the submarine sinking and floating mechanism, under the premise of keeping the center of gravity of the floating platform in the lower part, the floating or sinking state of the floating platform is adjusted by the amount of water injected into or discharged from the storage tank in the cavity. In addition, the floating platform can also be driven to float or sink by changing its center-of-gravity position. This control mechanism can change the dynamic features of the floating platform. The functions of this mechanism when used with the movable floating platform will be discussed later. The lower part goes deep into the deep layer of the water, and can swing under the impact of the water flowing on the horizontal plane. However, because the stationary floating platform is not easy to be shaken, more water flows are directed to the dynamic floating platform nearby, so that the dynamic floating platform can get more kinetic energy from the water flow path.

The following specifically describes the flywheel device based on a large-mass flywheel. Theoretically, the stationary floating platform in a hollowed bowling ball shape is lying on the water. In order to make it suspend vertically, with most of one end deep into the water like a fish float, it is necessary to reduce the weight of the upper part (for example, preferably using a hydraulic motor, which is a lightweight drive mechanism with a short stroke, a large torque, and a small volume, as the drive device connected to the transmission shaft), and configure a huge counterweight at the underwater part to lower its center of gravity (a large-mass flywheel in the flywheel device can do this). Conversely, this is also the reason why one of the floating platforms is designed with this structure: just to facilitate the installation of this kind of flywheel device. The flywheel device is connected to the power generation device through a coordination mechanism such as a clutch device and a speed change device to form a generator set with a flywheel and an energy buffer mechanisms. For the voltage and current, two elements of electric energy output, the change value of any one of them can be used as a reference, to set a range of allowable fluctuations, and realize the linkage of these coordination mechanisms through some fly-by-wire control devices. When the external environment or electrical power demand changes, automatic storage and output allocation of energy can be realized. For example, when the energy input is greater than the energy output in a certain period of time, the kinetic energy of work is converted into the potential energy of the flywheel for temporary storage; when the energy input is less than the energy output in a certain period of time, the potential energy of the flywheel is converted into the kinetic energy of work to compensate power for the generator. This energy buffer mechanism that uses a high-mass flywheel for energy storage can realize the staggered peak cut for high-power energy storage and output, and adjust the power in real time. It plays a great role in stabilizing the power generation system and ensuring the power supply, with the incomparable advantages over many other energy buffer and power adjustment mechanisms.

Figure 9:
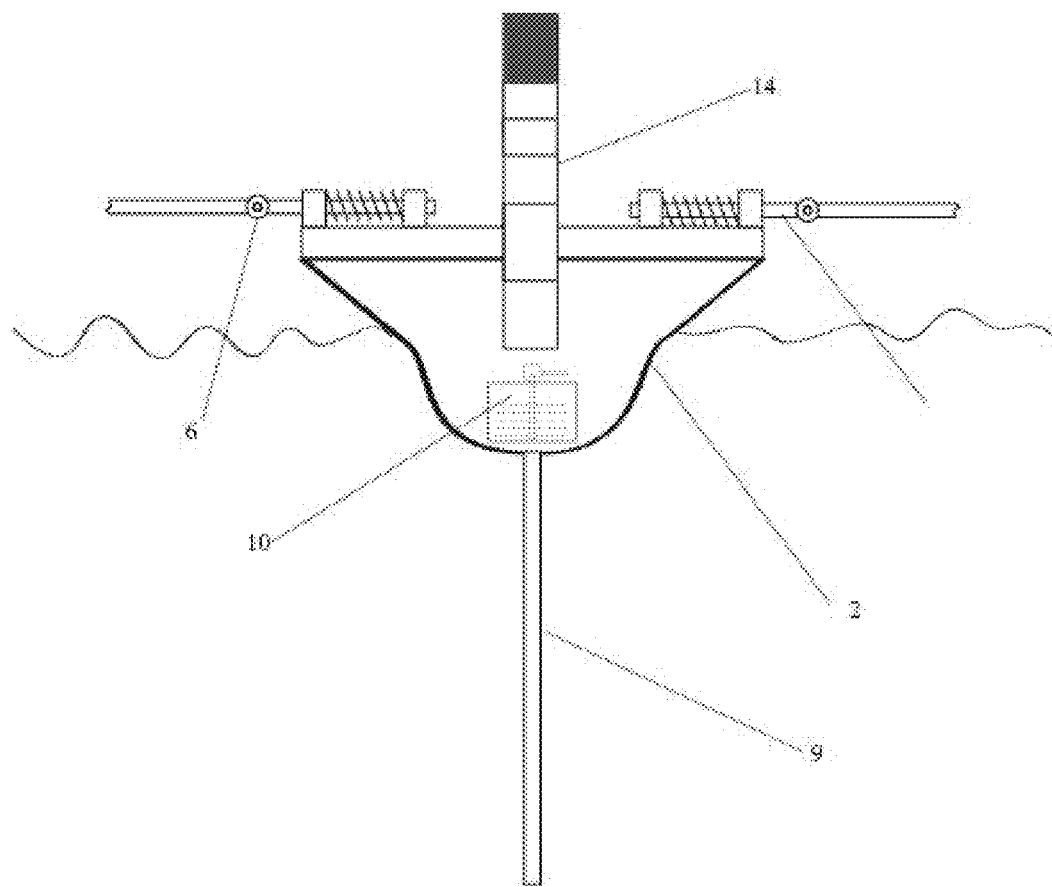
FIG. 9 is a sectional view of a movable floating platform configured with a peripheral lifting device according to the present invention.
Figure 11:
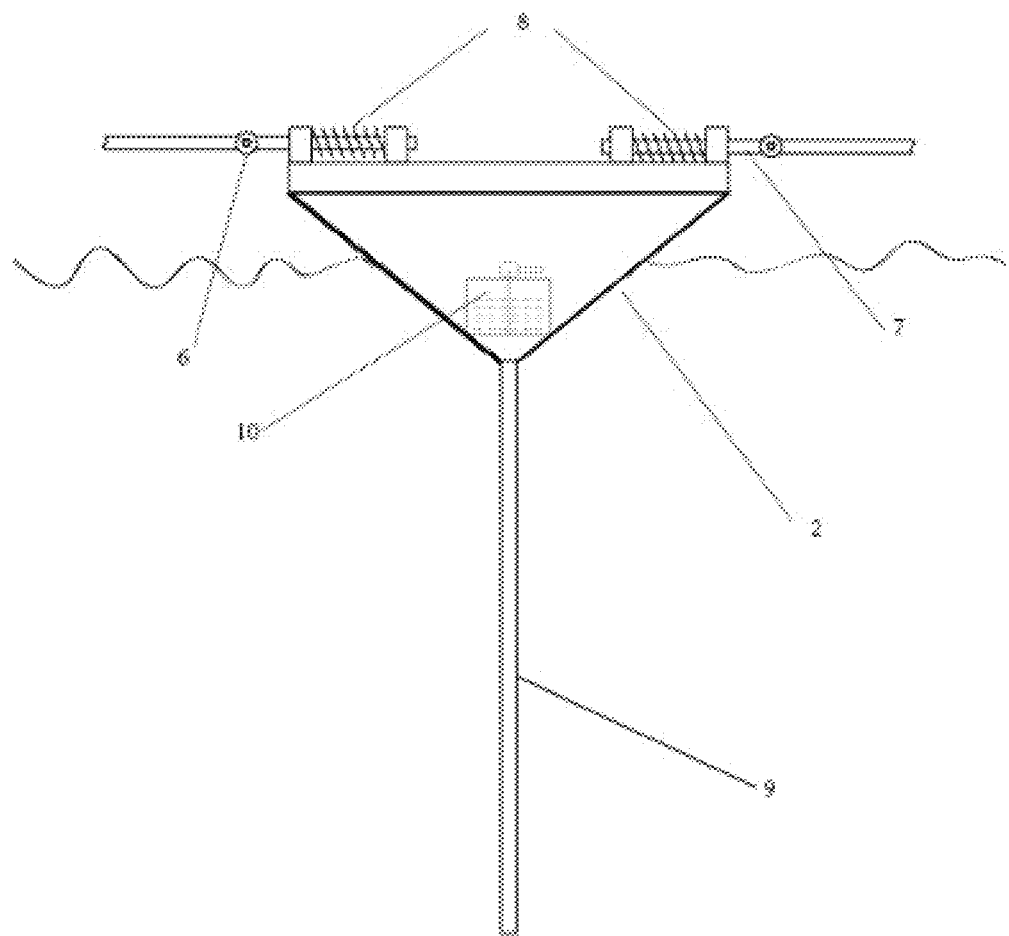
FIG. 11 is a sectional view of another movable floating platform according to the present invention.
Figure 12:
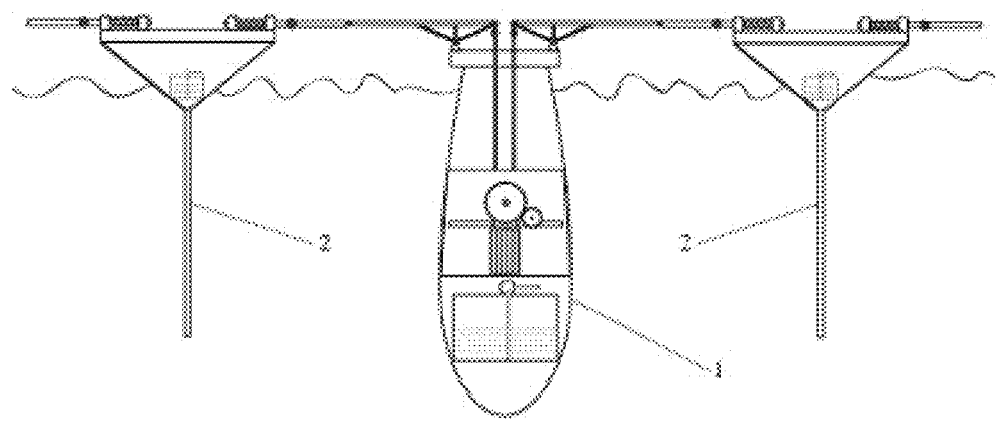
FIG. 12 is a sectional view of another stationary floating platform and two symmetrically arranged movable floating platforms according to the present invention.
Figure 14:
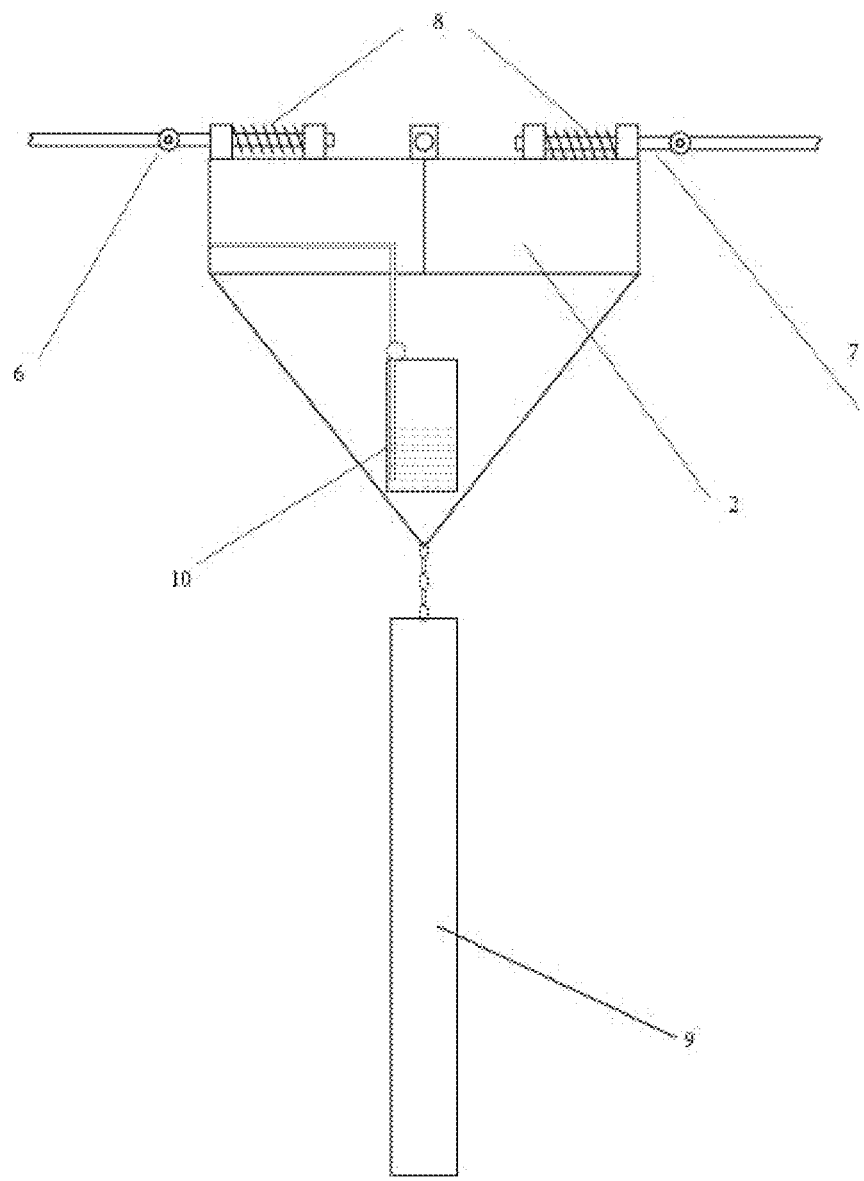
FIG. 14 is a sectional view of another movable floating platform according to the present invention.

Certainly, the movable floating platform seeks for "dynamic", and adopts a flat structure that tends to the water surface, to adapt to the effect of waves. In this example, the movable floating platform is designed as an integrated form with a big upper part and a small lower part. The upper part is an inverted cone-shaped hollow sealed cavity, and the lower part is connected to a long strip as a counterweight. See FIG. 6, FIG. 11, and FIG. 14, where FIG. 11 and FIG. 14 are drawings in the last two applications. Under normal conditions, the lower part is semi-submersible and vertically floating. Most of the cavity in the upper part is above the water, leaving the floating platform easy to shake. The lower counterweight is deep into the water to prevent flip. The floating platform looks like a large spinning top floating on the water. The top square platform is normally kept on the water surface, and four spring return devices in cross symmetry are sleeved in four connecting rods on the four sides of the platform, so that the connecting rod can be stretched linearly along the axis of the connecting rod or rotate around the pivot of the connecting rod. The connecting rods extend outwards and are connected by movable joints to the rocker arms on the stationary floating platform that extend from four directions. This form makes the movable floating platform have four large downwardly inclined sides, which can be lifted up under the impact of the surface waves, so that the movable floating platform easily loses its balance upon stress, allowing the movable floating platform to obtain strong kinetic energy from the floating path. In addition, the above-mentioned sink-and-float mechanism is used. When the wave is small, the movable floating platform floats up with the stationary floating platform, the center of gravity moves up, and a small external force can break the original balance and promote the device to vibrate. When the wave is large, the movable floating platform sinks, and the center of gravity moves down, which can reduce the impact of external forces on it and weaken the vibration of the device. In this adjustment process to change the dynamic features of the floating platform, the most important thing is to change the vibration frequency and amplitude of the device. Besides, there is a stabilizing effect, which will be described later. In addition, a liftable mass mechanism can be installed in the part of the movable floating platform above the water to promote the dynamic changes by changing the center-of-gravity position, as shown in FIG. 9. This mechanism set above the waterline can not only adjust the center of gravity and strengthen the vibration, but also can be designed as a device with some windward area that can shake the movable floating platform under the action of wind, and can use wind energy to generate kinetic energy. Although the topic here is the utilization of wave energy, the utilization of wind energy will definitely be used in practical applications. This type of mechanism is only simply mentioned here, but some ways to improve the work performance are still emphasized here. For example, a cluster of floating platforms can form a large floating structure on the sea surface, which is an expanded land area and placement frame, and can cooperate with and complement the devices for utilizing wind energy, light energy, or other types of wave energy, to improve the energy harvesting efficiency of the devices.

To further make the movable floating platform "move", the lower part is a swing counterweight connected to the bottom of the inverted cone-shaped cavity in the upper part, a long strip structure that is more sensitive to the impact of water flows. The counterweight can keep the center of gravity of the movable floating platform in the lower part, so that the suspending cavity with the center of gravity in the upper part can always tend to a vertical inverted state. Also, the counterweight can sense the impact of the water flows on the deep horizontal plane and therefore vibrate to affect the dynamic change of the cavity, so that the movable floating platform can obtain strong kinetic energy from the water flow path.

As for the spring return mechanism, its primary purpose is to serve as a buffer upon deformation and restore the entire cluster structure. Every compression or extension of the spring is accompanied by the process of converting kinetic energy into potential energy and potential energy into kinetic energy. Under the overall operating mechanism, even if the spring is instantly compressed to generate potential energy, the release of this potential energy by elastic force is always a long process in which a shock gradually reduces, that is, the damping phenomenon, which is not complete at one time. Therefore, the spring return mechanism here also adjusts the output of the buffered energy, but it can only passively buffer the energy and cannot actively control it, and the time effect of this time-staggered peak cut process is relatively short. However, this mechanism is similar to and equally important as the mechanism for buffering flywheel-generated energy and adjusting the power.

The following describes the functions of the float-and-sink and center-of-gravity control mechanism, as well as the beneficial effects. Floating objects on the water can make themselves float up by reducing the load, but this does not necessarily affect the change of the center of gravity. Then this mechanism can ensure that the center of gravity moves up when the object floats and moves down when the object sinks. Certainly, there is also a way to change the center of gravity without affecting the floating or sinking state, that is, moving up the position without changing the quality and quantity, for example, lifting up or down by using the peripheral mechanism. Two effects need to be achieved: first, the object floats or sinks and the center of gravity changes; second, the center of gravity changes, and the frequency or amplitude also changes. The second one is the most important. The following explains how the change of the center of gravity adjusts the vibration frequency or amplitude. Floating or sinking will change the floating platform's center of gravity, and the distance between the water surface and the rocker arm and other operating mechanisms used for work on the waterline will change. As a result, the torque, vibration time, and vibration distance change, which will affect the vibration frequency and amplitude. This mechanism is called a center-of-gravity, frequency and amplitude adjustment mechanism. The performance of a power generation device is determined not by the short-term output electrical energy, but by its capability of providing electrical energy stably over a long period of time. To realize this capability, we must consider that both the environment and demand will change. Therefore, a variety of adaptive control mechanisms are required. We still select the change value of the voltage or current as a reference, to set a range of allowable fluctuations, and realize the linkage with the mechanism for adjusting the center of gravity, frequency, and amplitude through the fly-by-wire control devices. When the external environment or electrical power demand changes, the vibration frequency and amplitude of the floating platform is automatically adjusted, thereby adjusting the working power of the working device in real time, and ensuring stable power output. This mechanism delivers even better effects when used with the aforementioned flywheel-generated and spring-generated energy buffer and power adjustment mechanisms. Now it turns to the impact of the floating or sinking state and center-of-gravity changes on the overall stability. When the movable floating platform and the stationary floating platform sink together, the center of gravity moves down, the bonding area with water increases, and the surface area exposed to the wind and waves decreases, to reduce the impact of wind and waves and enhance the stability of the whole system. This mechanism can deal with environmental and climate changes, and provide self-protection under disasters and climate changes. It can be seen that this mechanism can adjust the floating or sinking state and the center of gravity by the floating platform and change the center of gravity by peripheral mechanisms, providing dual-security in the entire power generation system.

Although the wave motions have directionality sometimes, they are more scattered and irregular. When a cluster structure of a quadrilateral grid shown in FIG. 2 is formed, each floating platform is a node of the grid and will be affected by various unbalanced forces in the horizontal and vertical directions, so it must have structural strength and deformability. Otherwise, the entire device will not operate normally. One of the solutions is as follows: The four rocker arms on the stationary floating platform are designed to have two powerful movable fulcrums on the stationary floating platform, like a front-out diamond cantilever structure of a seesaw. As long as the rocker arms have a structural strength meeting the hydrological conditions in the sea area and are not easy to deform, the entire grid structure is maintained movable in order. This also embodies the concept of seeking stability. In response to the pulling or twisting in the horizontal and vertical directions, the four connecting rods on the movable floating platform can turn, stretch, and move circularly under the joint action of the movable joints and the spring return devices. This embodies the concept of seeking movability. The cooperation of the "stationary" floating platform and the "movable" floating platform not only meets the deformation requirements of this grid structure but also keeps it relatively stable, so that the functional units of the system can operate normally.

Certainly, the work mechanism of this example also has its strengths and weaknesses. Experienced technicians can easily figure out that the ability to use water floating is better than the ability to use water flowing. The improvement scheme is as follows: When the water body energy is mainly from deep-seated flow, two simple arc structures with an upward angle and a curved section arranged at an angle can be installed in the deep direction to guide the deep water to change from laminar flow to upward flow, a surge towards the surface is formed; when the water body energy is mainly from the surface waves, but the waves are too small to generate enough kinetic energy to drive the device, two arc structures with an inclined angle and a curved section arranged at an angle can be installed in the surface direction to guide the waves to gather towards the movable floating platform. Such an arc-shaped structure with an included angle, which relies on a stationary floating platform or other structures, is called a water diversion device. A water diversion device relying on a stationary floating platform is used as an example here. As shown in FIG. 8, the water diversion device can guide the flow energy of deep water towards the movable floating platforms on both sides and transform it into the power to drive the movable floating platform to move. Some environmental conditions are created, to exert the strengths of this mechanism, thereby improving the overall energy harvesting capability of the device. Utilizing the existing conditions or making slight improvements to improve the work efficiency is also an advantage of the present invention.

The wave power generation unit suitable for large-scale application and the system thereof are described above in a specific implementation. Although it is sufficient to explain the power generation unit composed of more types of water platforms, the systems of other cluster structures rather than the quadrilateral structure, and their basic technical characteristics in various improvements, a description of only some forms and functions in the work process cannot fully explain the advantages of the present invention. The advantages of the present invention are summarized from the following four aspects:

I. Structural Features and Technological Advantages:

1. In the present invention, only two types of floating platforms are combined, and they can work in pairwise interaction mode by utilizing the dynamic difference between them caused by the impact of waves. Such a simple structure is easy to manufacture and more reliable.

2. In the present invention, the water platform does not rely on a fixed foundation. The interactive working mode between platforms, and a variety of work adjustment and self-protection mechanisms can deal with various changes. In addition, a large-scale cluster can be formed by expanding units. In this way, the platforms can adapt to the distribution range without being much affected by environmental conditions and climates, so that they can be placed in any areas rich in ocean waves and tidal energy. The platforms can be widely applicable to almost all marine environments.

3. In the present invention, the main structure of the water platform is floating and movable. The platforms can still be moved to another place after being constructed in one place.

4. The water platforms of the present invention are particularly suitable to be combined into larger cluster structures. A cluster structure composed of multiple individual platforms can better meet the operational safety requirements such as structural strength and stability under the worst sea conditions.

5. The main structure of the floating platform in the present invention is similar to that of a ship, and it is suitable to be manufactured in a large factory with good conditions according to unified standards. It can be put into use immediately after being towed to the site. The site selection and layout often do not require the cumbersome submarine terrain exploration and infrastructure construction. Large-scale assembly is not required on site. The platforms are hardly restricted by the local supporting capacity at the selected sites. They are easy to install and can be put into use immediately.

6. In the present invention, the key devices are installed in the sealed space inside the water platform and the space on the waterline of the water platform. The underwater part of the platform outside has no movable action mechanism, and there are no precise functional components that require special waterproof and anti-corrosive treatment. The material and process requirements are general. There is an inspection entrance on the surface, allowing personnel to go into the platform for routine maintenance. There are complete safeguard measures, making the platform durable.

7. The water platform cluster established in the present invention can form a large conjoined structure on the water surface, which is an expanded land area and a placement frame for configuring the devices that utilize wind energy, solar energy, and other types of wave energy. In addition, the cluster can be expanded to improve the overall efficiency.

8. When the water platform of the present invention is moored by using anchor chains and ropes, the device can adjust the best stress direction automatically with the waves, without requiring complicated adjustment control mechanisms.

9. In the present invention, the peripheral lifting device deployed on the water platform can be designed as a device with a certain windward area, which uses wind energy to generate kinetic energy. This allows direct use of other types of energy within this mechanism.

10. In the present invention, when the water body energy is mainly from deep-seated flow, a water diversion device is installed in the deep layer based on the water platform or other types of structures, which can guide the deep water to change from laminar flow to upward flow, forming a surge toward the surface. When the water body energy is mainly from surface waves, but the waves are too small to generate sufficient kinetic energy to drive the devices, a water diversion device is installed on the surface through the water platform or other structures, to guide the waves to gather towards the movable floating platform. In this way, environments that are conducive to exert the advantages of this device is created, which is also a structural advantage.

II. Main Functions and Auxiliary Functions:

1. In the present invention, according to the specific shape requirements, the water platform is designed with an adaptive form and functions, special shapes and multiple coordination and guarantee mechanisms are used, so that any water body energy from any direction can drive the device to operate effectively, no matter whether the water flows on the surface or at the deep layer. This can better utilize the wave energy. Especially in a large cluster composed of multiple units, the total wave energy is considerable.

2. The flywheel device used in the present invention is a device that buffers energy to adjust the working power, or uses a large mass structure to stabilize the state of the platform in water.

3. The spring return device used in the present invention is another device that can buffer energy to adjust the power, or is used as a buffer upon deformation of the interconnection mechanisms between platforms and restores the entire cluster structure.

4. In the present invention, the center-of-gravity control mechanism realized by the water storage device and the peripheral lifting device of the water platform can change the operating characteristics of the system and units. This mechanism can affect the vibration frequency and amplitude. It is linked with the fly-by-wire control device in real time to coordinate the power of the generator set. This mechanism can also improve the stability. When necessary, the center-of-gravity positions of all platforms can be moved down to increase stability, and reduce the impact of wind and waves to achieve self-protection against extreme disasters or climates.

5. In the present invention, when several units are expanded and connected to form a large cluster, high-power electric energy can be output. In addition, the units are attached to the sea surface tightly like a movable breakwater without reinforced concrete or sharp propeller blades, which can protect against disasters without doing harm to marine life. This is of great value to environmental and ecological protection.

III. Disaster Response Measures:

1. In addition to the wind and wave-resistant structure and appearance, some water platforms in the present invention also have mechanisms to move down the center of gravity by adjusting their sinking and floating states or using peripheral mechanisms. This can increase the stability, and reduce the impact of wind and waves for self-protection. In addition, the water platforms can be combined into a larger cluster by expanding devices, enhancing the ability to resist disasters in terms of size and quantity.

2. The water platforms selected in the present invention are almost structures with a sealed space, with the overall center of gravity in the lower part. With such a structure, the platforms are not easy to flip. Especially, when they are networked to form a cluster, they have a large contact area with seawater and are almost attached to the sea surface, making it impossible to flip under wind and waves. Even in hurricane disasters, they can be moved to safe places by using their floating and towable features. They have superb disaster protection performance.

3. In the present invention, the water platform has a sealed space, which can accommodate and isolate the precise devices from the external harsh environments. There are no external precision components that require special protection and treatment. There is an above-water maintenance channel that allows personnel to go into the interior of the platform. There are also countermeasures and safeguard measures against diseases and disasters caused by environments, materials, structures, worn-out, and aging.

IV. Prospects for Large-Scale Application:

1. In the present invention, the multiple water platforms that serve as the accommodation basis are organized according to the expansion requirements to form a large-scale cluster.

2. The water platform in the present invention can be made larger, so that one unit can provide sufficiently large power. The cluster composed of multiple units can provide even larger power. In addition, when multiple units are combined, structural components can be shared, which is cost-effective.

3. The present invention supports integration with an adaptive power adjustment mechanism, a high-power energy buffer mechanism, a self-protection mechanism to deal with diseases and disasters, and even wind energy devices, solar energy devices, and other types of wave energy utilization devices. Particularly, a large multi-unit cluster with multiple mechanisms can meet the high-power requirements of industrial application.

4. The structure of the individual water platform in the present invention is similar to that of a ship, and its production materials and process requirements are also similar to those of a ship. A unified product standard is easily formulated for factory manufacturing. On earth, the oceans account for 70% of the surface area. Wave energy has a wider application area and market prospects than wind and light energy. This may foster a new large-scale industry.

It is easily figured out that the ultimate goal of the present invention is to provide a large-scale wave power generation system with a promising industrial application prospect, and the above principle disclosure is only based on a specific example, some structures and functions, to facilitate those of ordinary skill in the art to understand the basic blueprint ideas of the present invention. Those skilled in the art can easily figure out that there are still many coordination mechanisms such as structure setting, operation control, mechanism linkage, automatic power transmission and distribution, as well as more different forms and expansion modes of the water platforms. Many hardware and software details still need to be supplemented. The present invention should not be limited to the above example. Although the present invention is described in detail with reference to this example, this example is merely used to explain the technical solutions of the present invention, but not intended for limiting the present invention. Those of ordinary skill in the art should understand that the additions, modifications, and substitutions made according to the principles of the present invention, or derivative improvements made on this basis should not depart from the spirit and scope of the technical solutions of the present invention, and should fall within the protection scope of the claims of the present invention.

What is claimed is:

1. A wave power unit for large-scale application of a power generation system, comprising at least a stationary floating platform and a movable floating platform, wherein:
   one stationary floating platform and one movable floating platform are paired to form a functional unit, with plurality of said functional units being combined into the power generation system;
   the stationary floating platform and the movable platform are configured to dynamically interact in response to wave action to convert wave energy into mechanical energy to at least drive a power generation device to generate power;
   the stationary and the movable floating platforms are all water suspended platforms with a sealed space; wherein the sealed space in the stationary and the movable floating platforms are configured to accommodate mechanical operating devices to prevent from water; the stationary floating platform comprises elongated structure configured to extend into the water;
   the movable floating platform comprises a flat structure configured to be disposed on the water surface;
   the stationary floating platform is configured as a carrier to assist in conversion of mechanical energy to electric energy; and
   the movable floating platform is configured as a carrier to assist in conversion of wave energy to mechanical energy.

2. The wave power unit according to claim 1, wherein the stationary floating platform comprises outwardly extending rocker arms connected to connecting rods extending from the movable floating platform through movable joints such that when the movable floating platform moves, one end of the rocker arm is driven to move up and down, and then a transmission shaft connected to the other end of the rocker arm is driven to reciprocate, thereby driving the power generation device to generate power.

3. A wave power generation unit for large-scale application, comprising at least two types of floating platforms that dynamically differ from each other under the effect of waves, the at least two types comprising a stationary floating platform and a movable floating platform, wherein:
   one stationary floating platform and one movable floating platform are paired to form a functional unit; the stationary floating platform is configured with four movable floating platforms in cross symmetry, and the movable floating platforms are configured with four stationary floating platforms in cross symmetry; and the dynamic difference between the two floating platforms caused by waves causes interactions between the two floating platforms that convert wave energy into mechanical energy, and further at least drive mechanical devices to operate and a power generation device to generate power;
   the floating platforms are all water suspended platforms with a sealed space for accommodating mechanically operating devices to prevent from water;
   the stationary floating platform is an elongated bowling ball-shaped structure with a hollow sealed cavity that extends into the water; and the movable floating platform is a flat inverted cone-shaped structure with a hollow sealed cavity that is disposed on the water surface;
   the stationary floating platform is configured as a carrier for conversion of mechanical energy to electric energy, and the movable floating platform is configured as a carrier for conversion of wave energy to mechanical energy;
   the stationary floating platform is provided with outwardly extending rocker arms, which are connected to connecting rods extending from the movable floating platform through movable joints such that when the movable floating platform moves, one end of the rocker arm is driven to move up and down, and then a transmission shaft connected to the other end of the rocker arm is driven to reciprocate, thereby driving a hydraulic driving device to operate and a flywheel device and the power generation device to generate power;
   the movable floating platform comprises a spring return mechanism; the connecting rod is sleeved in the spring return mechanism, and the spring return mechanism enables the connecting rod to linearly expand or contract along the axis of the connecting rod or to rotate around the pivot of the connecting rod; and the connecting rod extends outwards, and is connected to the rocker arm on the stationary floating platform through the movable joint; and
   the stationary floating platform and the movable floating platform each have a water storage device, which controls the center-of-gravity position or the floating and sinking states of the floating platform to change its dynamic features by injecting water into or discharging water from a storage tank, and is used in a mechanism for adjusting the working power and dealing with environmental and climate changes.

4. The wave power generation unit according to claim 3, wherein the stationary floating platform has a flywheel device comprising a large-mass flywheel configured as a high-power energy buffer for adjusting the working power or a mechanism for stabilizing the platform's state in water.

5. The wave power generation unit according to claim 3, wherein the movable floating platform comprises a spring return device configured as an energy buffer to adjust the working power, or a buffer upon deformation of interconnection mechanisms between the platforms to restore the mechanisms.

6. The wave power generation unit according to claim 3, wherein the movable floating platform comprises a peripheral lifting device configured to change dynamic features of the floating platform by changing the center-of-gravity position of the floating platform, and as a mechanism for adjusting the working power and dealing with environmental and climate changes.

7. The wave power generation unit according to claim 3, wherein the movable floating platform comprises a windward device configured to withstand the sea breeze by increasing the floating platform floating capacity.

8. The wave power generation unit according to claim 3, wherein the stationary floating platform comprises a water diversion device configured as a mechanism that guides the deep water to float on the surface or guides the waves on the surface to gather for doing work.

9. The wave power generation unit according to claim 3, wherein the stationary floating platform and the movable floating platform each are provided with an inspection entrance to the interior of the floating platform.

10. The wave power generation unit according to claim 3, wherein the stationary floating platform has structural components connected to a fixed foundation configured to constrain the stationary floating platform or fix the stationary floating platform on the seabed.

11. The wave power generation unit according to claim 3, wherein a bottom of the hollow sealed cavity of the movable floating platform is connected with a swing counterweight.

12. A wave power generation system suitable for large-scale application, wherein the wave power generation system comprises a cluster structure formed by a number of the wave power generation units according to claim 3.

13. A wave power generation system suitable for large-scale application, wherein the wave power generation system comprises a cluster structure formed by a number of the wave power generation units according to claim 4.

14. A wave power generation system suitable for large-scale application, wherein the wave power generation system comprises a cluster structure formed by a number of the wave power generation units according to claim 5.

15. A wave power generation system suitable for large-scale application, wherein the wave power generation system comprises a cluster structure formed by a number of the wave power generation units according to claim 6.

16. A wave power generation system suitable for large-scale application, wherein the wave power generation system comprises a cluster structure formed by a number of the wave power generation units according to claim 7.

17. A wave power generation system suitable for large-scale application, wherein the wave power generation system comprises a cluster structure formed by a number of the wave power generation units according to claim 8.

18. A wave power generation system suitable for large-scale application, wherein the wave power generation system comprises a cluster structure formed by a number of the wave power generation units according to claim 9.

19. A wave power generation system suitable for large-scale application, wherein the wave power generation system comprises a cluster structure formed by a number of the wave power generation units according to claim 10.

20. A wave power generation system suitable for large-scale application, wherein the wave power generation system comprises a cluster structure formed by a number of the wave power generation units according to claim 11.

* * * * *